United States Patent Office 3,435,563
Patented Apr. 1, 1969

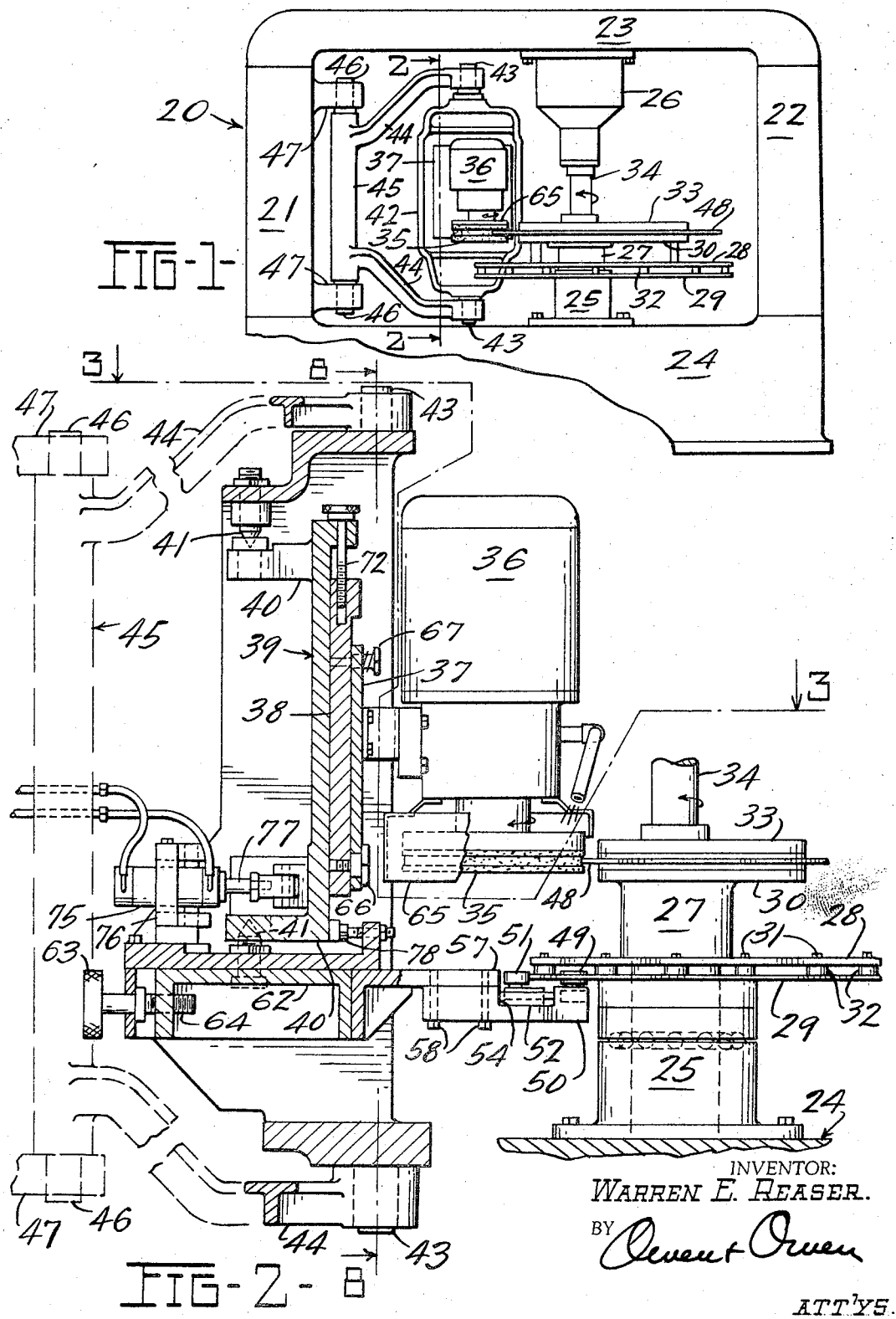

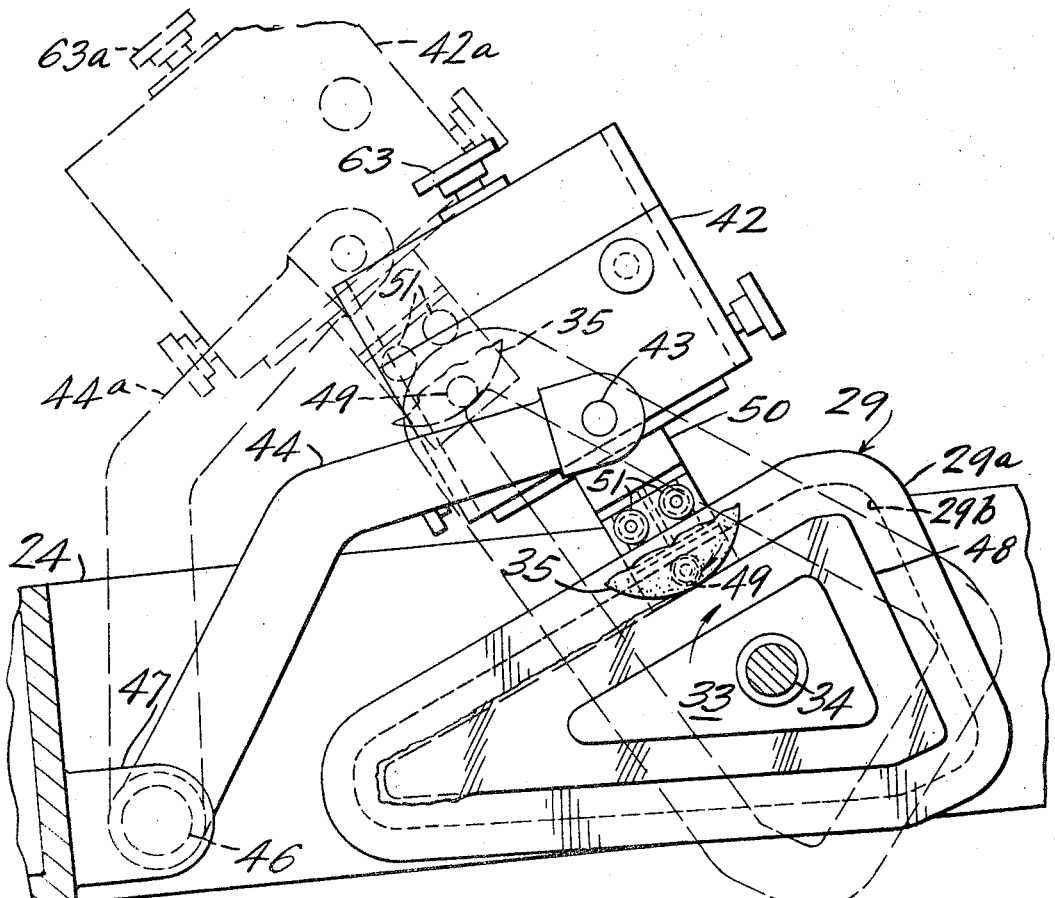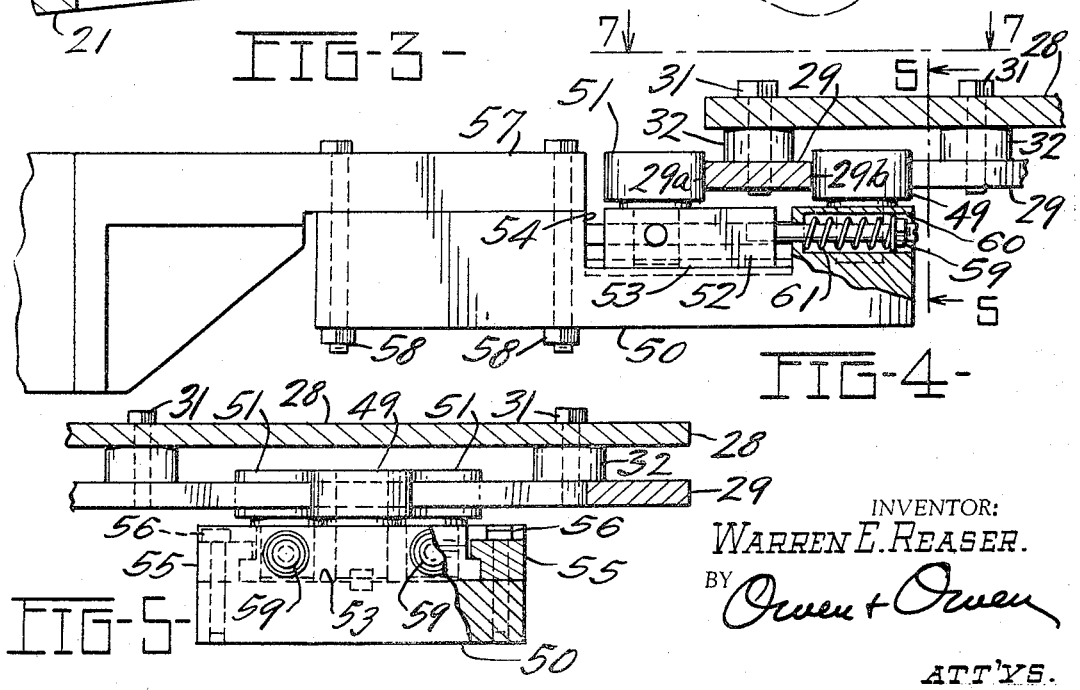

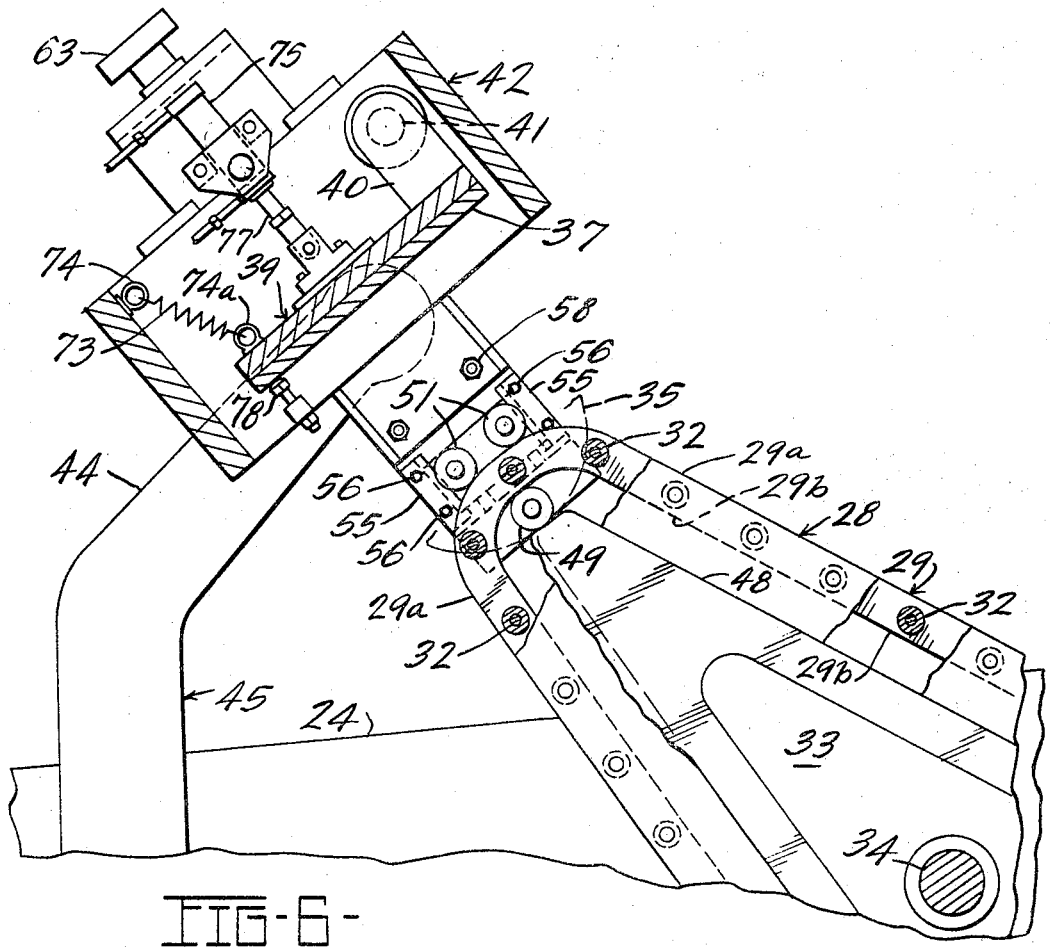
FIG-6-
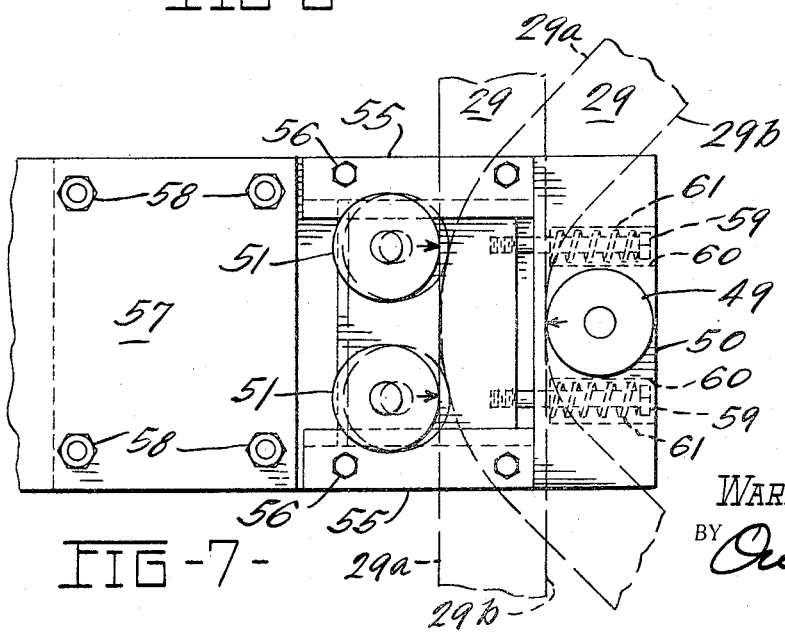
FIG-7-
INVENTOR:
WARREN E. REASER.
BY Owen+Owen
ATT'YS.

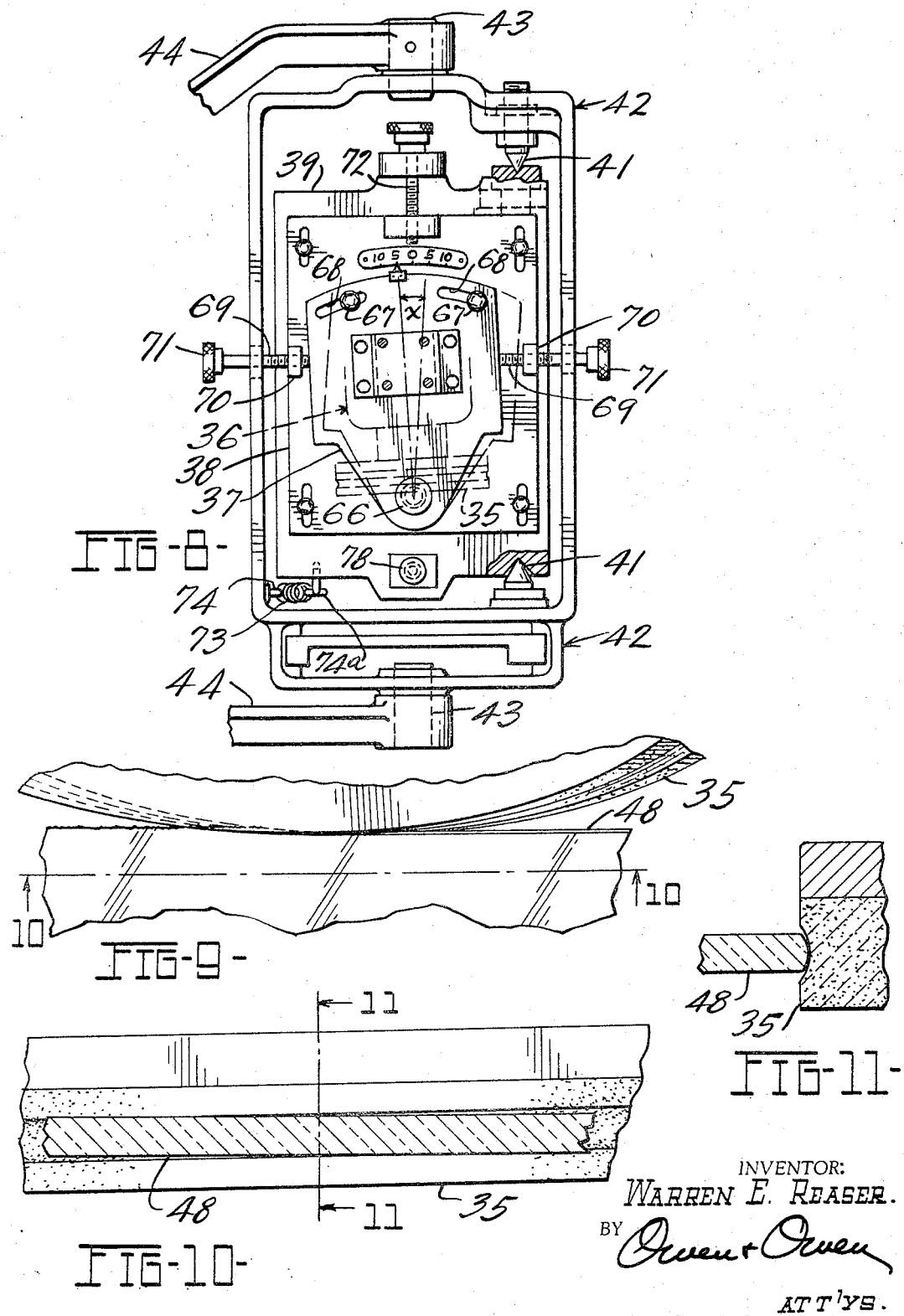

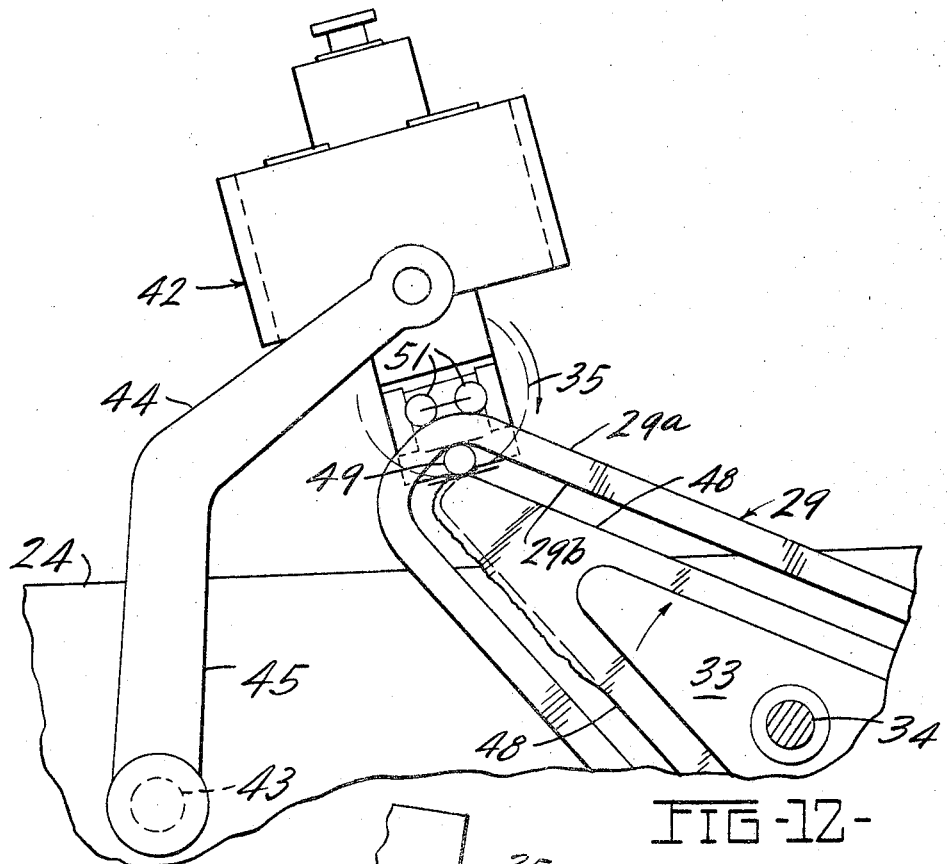
FIG-12-
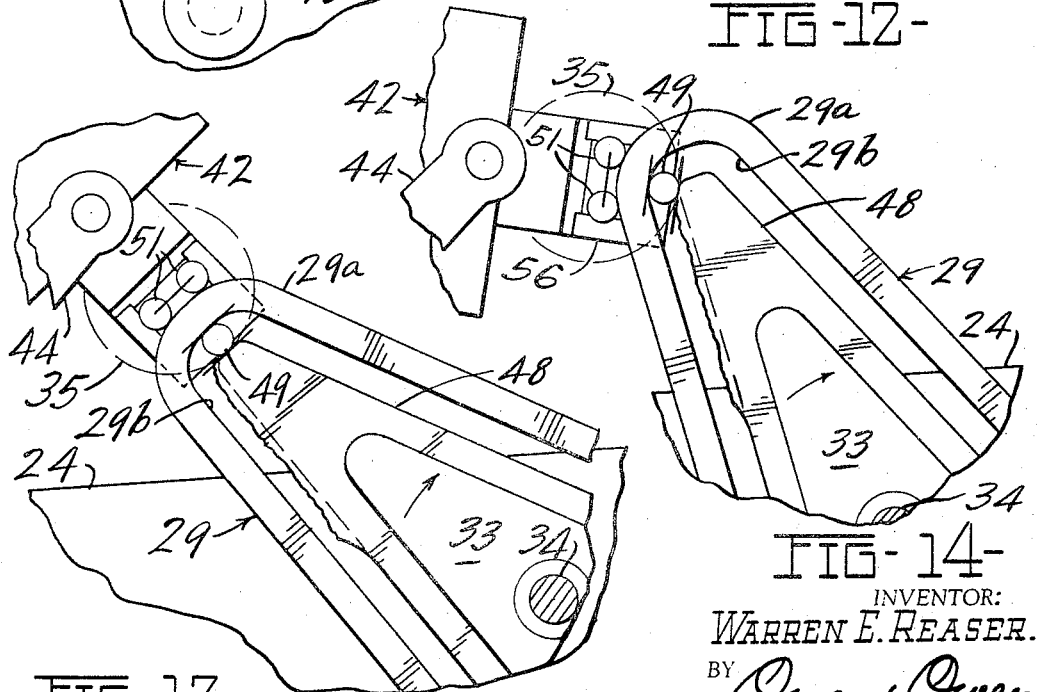
FIG-13-
FIG-14-
INVENTOR:
WARREN E. REASER.
BY Owen + Owen
ATT'YS.

3,435,563
TANGENT GRINDER
Warren E. Reaser, Toledo, Ohio, assignor to The Sun Tool & Machine Company, Toledo, Ohio, a corporation of Ohio
Continuation-in-part of application Ser. No. 530,605, Feb. 28, 1966. This application Mar. 10, 1967, Ser. No. 622,250
Int. Cl. B24b 5/26, 9/00
U.S. Cl. 51—101
11 Claims

ABSTRACT OF THE DISCLOSURE

A machine for grinding the edges of glass plates having irregular non-circular contours, particularly those having sharp outside corners. The machine has a support for mounting the glass plate for rotation on an axis normal to the surface of the glass plate. A grinding wheel is mounted for rotation in a frame and on an axis at least substantially parallel to the axis of rotation of the glass plate and the frame is mounted on a carrier for oscillation in a carrier on an axis that is parallel to the axis of rotation of the glass plate and that is spaced away from the axis of the grinding wheel. The carrier is pivoted for translating the frame and the grinding wheel toward and away from the axis of rotation of the glass plate. The machine has a contour template and an attitude control cam mounted coaxially with the glass plate. The frame mounts a follower for the template by which the carrier is translated and has means that engages the attitude control cam for compensatorily oscillating the frame in the carrier in order to maintain a line of attack of the grinding wheel on the edge of the glass plate, at the same position relative to the wheel mounting frame and thus for maintaining constant the angle between (1) a line through the axis of rotation of the grinding wheel and the line of attack of the wheel on the edge of the sheet of glass and (2) a line through the axis of oscillation of the frame and the axis of rotation of the grinding wheel.

---

This application is a continuation-in-part of U.S. patent application No. 530,605, by the same inventor, filed Feb. 28, 1966, now abandoned.

While a machine embodying the invention is suitable for the edge grinding of pieces of glass of almost any contour, a relatively small, generally triangular piece such as a vent glass for an automobile, will be used in the following description to illustrate the operation of a machine embodying the invention.

Edge grinding machines are known in which sheets of glass to have their edges ground are clamped between opposed clamping plates in axial alignment with templates of the same size and shape as that of the finished glass pieces. In such a machine, a grinding wheel is frequently mounted upon a frame which is moved inwardly and outwardly relative to the axis of rotation of the glass sheet to be finished, the movements of the grinding wheel in its frame being under the control of a roller which is carried by the grinding wheel frame and which engages the edge of the template. When the roller travels around an outside curve, and the grinding wheel correspondingly grinds around the edge of the corner of the glass piece, the line of attack of the grinding wheel with the glass sheet shifts angularly around the perimeter of the grinding wheel relative to the frame in which the grinding wheel and its driving motor are mounted. Because this shifting of the line of attack of the wheel with the plate may traverse as much as, say, 180° around the perimeter of the grinding wheel, it becomes difficult to provide suitable shields for the control of coolant and lubricating material which is flowed over the grinding wheel at its point of contact with the glass because the shield or guard on the grinding wheel must permit accessibility of the glass to the wheel over the same wide angular variance of attack positions.

It is one of the principal objects of the instant invention to provide a mechanism by which the line of attack of the grinding wheel to the edge of the glass piece remains substantially constant regardless of the passage of the cam contacting roller or rollers along either a straight edge, a convex edge or around a sharp outer corner.

It has also been suggested in the past, see for example Reaser et al. Patent No. 2,579,337 that tilting the axis of an edge grinding wheel slightly away from normal to the surface of the glass piece whose edge is being ground, has particular advantage when the periphery of the grinding wheel is circumferentially grooved in order to produce a rounded or seamed edge on the sheet of glass. When the edge of the sheet of glass being thus ground is straight and it extends tangentially of the grinding wheel and the glass sheet is moved relative to the grinding wheel along the tangential line, the slight angular tilt, say, two or three degrees, can successfully be utilized. This results in uniform contact of the entire concave surface of the peripheral groove in the wheel with the edge surface of the glass, and thus in a uniform wearing away of the wheel. This results in longer wheel life than is the case when the axis of the grinding wheel is normal to the surface of the sheet of glass whose edge is being ground and the gradual abrasion of the grinding wheel by the edges of sheets of glass requires frequent dressing of the wheel and consequent loss of wheel surface. This is particularly important where diamond type grinding wheels are used because the dressing away of unused portions of the wheels periphery results in a substantial economic loss.

In prior art edge grinding machines which rotate the sheets of glass and in which the frame of the grinding wheel is moved toward and away from the axis of rotation of the sheet of glass under control of a template contacting roller, because the line of attack of the grinding wheel with the edge of the glass shifts around the periphery of the grinding wheel relative to its frame, if the axis of the grinding wheel is tilted away from normal to the sheet of glass being ground, the higher side of the tilted grinding wheel extends above the plane of the glass and the lower side of the tilted wheel extends below the plane of the glass. Thus, when the line of attack of the grinding wheel on the glass shifts around the periphery of the wheel, the edge of the sheet of glass does not continuously contact the grooved periphery of the wheel at the same level so that the cross-sectional shape of the ground edge of the glass varies directly in accordance with the shift of its line of contact around the periphery of the wheel.

It is therefore another important object of the instant invention to provide an edge grinding machine wherein a grinding wheel having a grooved periphery with its axis tilted slightly away from perpendicular to the surface of the glass sheet being ground, can be employed, regardless of the sharpness of the outside corners of the glass sheet, without vertically shifting the groove of the grinding wheel and the edge of the glass sheet relative to each other; this object being achieved by maintaining a constant line of attack between the grinding wheel and the edge of the glass by maintaining the same attitude of the grinding wheel relative to the periphery of the glass sheet.

The foregoing problems inherent in prior art machines of this type and the advantages of an improved machine embodying the invention will be better understood from the following specification and from the drawings, in which:

FIG. 1 is a fragmentary front view in elevation of an edge grinding machine embodying the invention;

FIG. 2 is a fragmentary, vertical sectional view taken generally along the line 2—2 of FIG. 1 and shown on an enlarged scale;

FIG. 3 is a fragmentary, somewhat diagrammatic plan view along the line 3—3 of FIG. 2 illustrating how contact of the grinding wheel with the edge of the glass sheets, is controlled by an attitude control cam and a contour template;

FIG. 4 is a fragmentary side view, with parts broken away of the means for controlling translation of the carrier and oscillation of the frame, shown on an enlarged scale;

FIG. 5 is a fragmentary view, with parts broken away, taken along the line 5—5 of FIG. 4;

FIG. 6 is a fragmentary, somewhat diagrammatic, plan view, showing the position of the grinding wheel, motor frame, and carrier arm, and the means for controlling translation of the carrier and oscillation of the frame as the means engages the control rail at one apex thereof;

FIG. 7 is a fragmentary, enlarged plan view taken from the position indicated by the line 7—7 in FIG. 4;

FIG. 8 is a fragmentary view in elevation taken from the position indicated by the line 8—8 of FIG. 2;

FIG. 9 is a fragmentary sketch of the engagement of a straight edge of the sheet of glass with a grinding wheel having a peripherally extending groove and shown on an enlarged scale;

FIG. 10 is a fragmentary, vertical sectional view taken along the line 10—10 of FIG. 9; and FIG. 11 is a fragmentary vertical sectional view taken along the line 11—11 of FIG. 10.

FIGS. 12, 13, and 14 are schematic plan views showing three successive positions of a generally triangular glass sheet as it is rotated on its mounting axis and illustrating the successive attitude of the grinding wheel mounting frame under the control of the attitude cam in order to maintain a line of attack of the grinding wheel with the glass sheet at the same position angularly on the periphery of the grinding wheel relative to the grinding wheel mounting frame, according to the instant invention.

In general, a machine embodying the invention comprises a bidge-like frame 20 having side members 21 and 22 which support a cross beam 23. The side members 21 and 22 are erected on a bed 24 which extends beneath the cross beam 23. A pedestal 25 extends upwardly from about the center of the bed 24 in axial alignment with a downwardly directed cylinder 26 supported by the beam 23. The pedestal 25 contains suitable bearings for mounting a rotary support shaft 27 (see FIG. 2) which, in superposed order, carries a mounting plate 28 for a control rail 29 attached to the undersurface thereof, and a glass support plate 30. The control rail 29 is attached to the undersurface of the mounting plate 28 by means of a plurality of bolts 31 and is spaced below from the mounting plate 28 by a plurality of collars 32 surrounding the bolts 31. As illustrated, the control rail 29 is of the same general shape as the sheet of glass to be ground, only somewhat larger.

In this embodiment of the invention the control rail 29 serves a duel function, being both an attitude control means and a contour template means. The outer periphery 29a of the rail 29 is an attitude control cam and the inner periphery 29b is a contour template. The glass support plate 30 and an opposed clamp plate 33 are of smaller size than the sheet of glass to be ground so as to leave a considerable edge area of the glass sheet exposed and unobstructed. The clamp plate 33 is connected to the lower end of a piston 34 which extends out of the cylinder 26 and is rotatably mounted therein. The axis of rotation of the piston 34 and the support shaft 27 are coincident and the shaft 27 is rotated by a suitable motor and transmission located within the bed 24, but not shown in the drawings. Conventional electrical and/or pneumatic controls are provided in order to cycle the machine so as to rotate the support structure and the glass sheet carried thereby one full revolution for each cycle.

A circular grinding wheel 35 is mounted on the shaft of a motor 36, the motor 36 being carried by a support plate 37 which is, in turn, adjustably mounted on a base plate 38. The base plate 38 (see also FIG. 8) extends generally vertically and is mounted for slight vertical adjustment on a grinding frame plate 39. The plate 39 has a pair of rearwardly extending arms 40 having upwardly and downwardly directed sockets, respectively, for the reception of the ends of cone bearings 41, thus providing for the pivoting of the motor 36 and the grinding wheel 35 and their support members just described on the axis of the cone bearings 41.

The cone bearings 41 are mounted in the top and bottom cross arms of a gimbal frame generally indicated by reference number 42 (see also FIG. 1). The gimbal frame 42 and the mechanism carried thereby is mounted for pivotal movement on a vertical axis by trunnions 43 engaged in suitable bearings in the ends of a pair of heavy arms 44 of a C-shaped carrier 45. The carrier 45 is mounted for pivotal movement on a vertical axis by trunnions 46 (see FIG. 1) which are engaged in vertically spaced, horizontal ears 47 extending inwardly from the side frame member 21.

The carrier 45 provides for translation of the entire grinding mechanism toward and away from the axis of the glass support shaft 27. The gimbal frame 42 is mounted in the ends of the arms 44 of the carrier 45 for oscillation on the axis established by the trunnions 43.

A sheet of glass 48 of generally triangular shape is shown in position between the support plate 30 and the clamp plate 33.

The gimbal frame 42 is freely pivotal on the axis established by the trunnions 43 in the ends of the carrier arms 44 and is not urged in either direction except by the engagement of the control rail 29 with attitude control mechanism to be described below.

Movement of the carrier 45 as a whole toward and away from the axis of the support shaft 27 and thus translatory movement of the grinding wheel 35 relative to the axis of rotation of the glass sheet 48 is under the control of the inner periphery 29a of the control rail 29. A contact roller 49 rotatably mounted on a rectangular support block 50 engages the rail 29 on its inner periphery 29b and the outer periphery 29a is engaged by a pair of contact rollers 51 that are rotatably mounted on a plate 52 which is horizontally slidably mounted on a bed 53 of a cut-out portion 54 of the support block 50, and guided by ways 55 which are attached to the bed 53 by bolts 56 (FIG. 5). The support block 50 is in turn attached to the end of a horizontal arm 57 extending from the gimbal frame 42 toward the control rail 29 by means of bolts 58. Parallel headed rods 59 extend into bores 60 in the end of the support block 50, and are threaded into one end of the plate 52. Springs 61 surround the rods 59 being compressed between the bottoms of the bores 60 and the heads of the rods 59. The springs 61 urge the pair of outer rollers 51 toward the roller 49, thus pinching the control rail 29 therebetween to hold the rollers 51 against the outer periphery 29a and the roller 49 against the inner periphery 29b.

As best can be seen in FIG. 3, the inner roller 49 is of such size and is so positioned relative to the axis of the grinding wheel 35, that when the roller 49 engages the inner periphery 29b, the grinding wheel 35 guided along the proper path to finish the edge of the glass sheet 48 to the size and shape desired.

The horizontal arm 57 is mounted on a horizontal slide 62 (FIG. 2) that is adjustably positionable in the gimbal frame 42 by a handwheel 63 affixed on the end of a screw 64 which extends through a portion of the gimbal frame 42 and is threaded in the slide 62. The position of slide 62 (FIG. 2) that is adjustably positionable in the rollers 51 and 49 relative to the gimbal frame 42, is adjustable in order to compensate for wear of the surface of the grinding wheel 35 and to maintain the vertical alignment between the innermost edge of the roller 49 and the periphery of the grinding wheel 35.

In FIG. 3 it is assumed that the glass sheet 48 and its mounting and support mechanism including the control rail 29 are rotating in a clockwise direction. The position of the carrier 45 when the contour rollers 51 and 49 engage the control rail 29 at a portion of its periphery which is closest to the axis of the rotary support shaft 27, is shown in solid lines. The position of the carrier 45, gimbal frame 42 and grinding wheel 35 is shown in dotted lines when the rollers 51 and 49 are engaged with that portion of the periphery of the control rail 29 which is farthest away from the axis of the rotary glass support shaft 27.

The swiveling of the gimbal frame 42 in the arms 44 in order to maintain the location of the line of attack of the grinding wheel 35 on the edge of the glass plate 48 by varying the attitude of the gimbal frame 42 is under the control of the outer periphery 29a of the control rail 29 that is engaged by the spaced pair of rollers 51.

Referring now to FIG. 6, the relative positions of the gimbal frame 42, the grinding wheel 35 and the rollers 51 and 49 are shown when the rollers 51 and 49 are engaged with an apex at the inner and outer peripheries of the control rail 29, and when the grinding wheel 35 is engaging a corresponding apex on the outer periphery of the glass sheet 48. In FIG. 6, mounting plate 28, glass sheet 48 and control rail 29 are all being rotated in a clockwise direction. The rollers 51 hold the gimbal frame 42 in a position such that a line between the axes of the rollers 51 is parallel to a line that is tangent to the surface of the grinding wheel 35 at the line of contact with the glass sheet 48 and the line of contact of the roller 49 with the inner periphery 29b of the rail 29.

In the embodiment of the invention illustrated in the drawings (see FIGS. 3–6, 7) the control rail 29 is shown as being larger than the finished size of the glass sheet 48 by the same dimension around all sides, this being equal to the width of the rail 29 plus the diameter of the roller 49. Utilizing a grinding wheel of approximately 9¾ inches in diameter, this dimension is shown as three inches around all three sides of the glass sheet. Similarly, then, a line tangential to both surfaces of the contact rollers 51 is also three inches closer to the swivel axis of the gimbal frame 42 than is a line parallel thereto which is tangential to the surface of the grinding wheel 35.

By this geometric relationship, as is illustrated in FIGS. 3, 6 and 7, when the control rail 29 and glass sheet 48 are rotated on their axis determined by the support shaft 27, the distance of the inner and outer edge of the control rail 29 radially from the center of the shaft 27 determines the movement of the main carrier 45 to translate the grinding wheel 35 relative to the axis of the shaft 27 and the engagement of the rollers 51 with outer surface 29a of the control rail 29 controls the attitude of the gimbal frame 42 in the carrier 45, maintaining a line of attack of the grinding wheel 35 on the edge of the glass 48 at the same angular position on the periphery of the grinding wheel 35 relative to the gimbal frame 42.

In FIG. 6, the grinding wheel 35 is shown at an outside corner or apex of the glass sheet 48.

By comparing the relationships of the mechanism and the glass sheet 48 as shown in FIGS. 12, 13, and 14, the swivelling action of the gimbal frame 42 is seen. In these figures construction lines are drawn (1) between the centers of the attitude control rollers 51, (2) tangentially to the roller 49 at the line of contact with the inner periphery 29b of the control rail 29 and (3) tangential to the line of contact between the grinding wheel 35 and the edge of the glass sheet 48.

If the grinding wheel 35 and its driving motor 36 were rigidly mounted in the ends of the arms 44 of the carrier 45, the swivelling action of the gimbal frame 42 just mentioned would not occur. Under these circumstances the movement of the grinding wheel 35 from the point of attack illustrated in FIG. 12 to that illustrated in FIG. 13 would result in the actual line of attack between the grinding wheel 35 and the edge of the glass sheet 48 being translated in a counterclockwise direction some angular distance around the periphery of the grinding wheel 35 relative to the mounting frame 42. Similarly in movement from the position illustrated in FIG. 13 to the position illustrated in FIG. 14, were it not for the swivel mounting of the gimbal frame 42 and the control of its attitude exercised by the outer periphery 29a of the control rail 29 and its contact rollers 51, the point of attack of the grinding wheel 35 on the surface of the glass sheet 48 would be moved still farther angularly in a counterclockwise direction around the periphery of the grinding wheel 35 relative to its mounting frame 42. In other words, the resulting translation of the line of attack around the periphery of the grinding wheel 35 relative to the mounting frame 42 would vary the angle between a first line extending through the axis of rotation of the wheel 35 and the axis of the trunnions 43 and a second line extending through the axis of rotation of the wheel 35 and the line of attack of the wheel 35 on the edge of the glass sheet 48. The constancy of the point of attack of the grinding wheel 35 on the glass sheet 48 as maintained by the control just described, eliminates the necessity for the exposure of a large peripheral surface of the grinding wheel 35 to engagement with the glass sheet 48 thus simplifying the problems of shielding the edge of the grinding wheel 35 and of controlling the distribution of coolant and lubricating fluid which is flowed into a generally pan shaped shield 65 (see FIGS. 1 and 2) carried by the mounting means for the motor 36 and grinding wheel 35 and which extends around most of the periphery of the grinding wheel 35 except for a short, arcuate section across which there extend the displaceable bristles of a brush (not shown—see FIG. 2).

Referring now to FIGS. 9, 10, and 11, there is illustrated how the axis of the grinding wheel 35 is tilted slightly two or three degrees away from a line normal to the surface of the glass sheet 48, in order to extend the arcuate line of contact between the periphery of the grooved wheel 35 and the edge of the glass sheet 48. This tilt angle is indicated in FIG. 8 by the reference letter X. When the grinding wheel is running along a straight edge as is illustrated in FIG. 9, the line of attack of the grinding wheel 35 on the glass sheet 48 remains fixed in position and does not shift angularly around the periphery of the grinding wheel 35. However, when the grinding wheel 35 grinds around an outside corner, as during movement between the positions illustrated in FIG. 3, and in FIGS. 12, 13, and 14, unless the attitude of the gimbal frame 42 in the arms 44 were changed to maintain the line of attack of the grinding wheel 35 with the glass sheet 48, it can be seen in FIG. 10 that the upper edge of the grooved periphery of the wheel 35 shortly would be below the upper surface of the glass sheet 48 and, similarly, at the right, that the lower edge of the grinding wheel 35 shortly would be above the lower surface of the glass sheet 48.

The slight tilt angle X is set into the grinding wheel 35 by tilting the motor support plate 37 relative to the base plate 38. A tenoned swivel pin 66 (FIG. 2) extends through a hole near the bottom of the motor support plate 37 and is threaded into the base plate 38 so that its center line is centered on the peripheral groove of the grinding wheel 35. A pair of friction studs 67 extend through arcuate slots 68 cut in the motor support plate 37 to guide the angular movement of the motor support plate 37 relative to the base plate 38. Adjusting screws 69 extend through ears 70 at the sides of the base plate 38 and hand wheels 71 are pinned on the ends of the adjusting screws 69 so that the motor support plate 37 can be tilted and thus the axis of the grinding wheel 35 tipped through the angle X to establish the condition illustrated in FIG. 8.

The motor base plate 38 is vertically adjustable relative to the motor frame plate 39 by a lockable adjusting bolt 72 (FIG. 2) to properly position the grinding wheel 35 with its groove center at the same horizontal level as the center of the sheet of glass 48. The motor base plate 38 slides in suitable ways (not shown) formed at the sides of the motor frame plate 39.

The entire carrier 45 may be swung backwardly to translate the gimbal frame 42 and grinding mechanism away from the glass support structure, as for example, when changing the glass sheet 48. However, this is a very heavy mechanism and considerable time is saved in changing from one sheet of glass 48 to another sheet of glass 48 by providing for slight translatory movement of the grinding wheel 35 and its motor 36 in the gimbal frame 42 of sufficient distance to provide for removal of a finished glass sheet 48 and its replacement by a blank to be ground to finished size. As mentioned above, the grinding motor frame plate 39 is pivotally mounted by the two cone bearings 41 which are engaged in suitable sockets in arms 40 extending backwardly from the frame plate 39. A tension spring 73 (see FIG. 8) is engaged between an eye 74 near the back of the lefthand one of the side members of the gimbal frame 42 and a similar eye 74a at the near backside of the frame plate 39 (see FIG. 6). The spring 73 thus tends to swing the grinding frame plate 39 back into the gimbal frame 42 and away from the glass sheet 48 and the control rail 29.

At the commencement of a grinding cycle, after the operator has placed a new blank sheet of glass and it has been clamped in place, the cycle start button is pushed and the first incident to occur is the admission of air to a small horizontally oriented cylinder 75 attached to a bracket 76 mounted on the gimbal frame 42. A rod 77 of the cylinder 75 is hinged to the back of the frame plate 39 as its lower end. When actuated the rod 77 acts to swing the grinder frame plate 39 toward the glass sheet 48 to a fixed position against an adjustable stop 78, that is mounted in the lower cross member of the gimbal frame 42 and engaged by the front face of the grinder frame plate 39. At the conclusion of a grinding cycle, air to the cylinder 75 is vented and the spring 73 moves the grinder frame plate 39 back into the gimbal frame 42.

What I claim is:

1. In a machine for grinding around the edges of a sheet of glass having a non-circular shape, said machine having means for mounting a sheet of glass to be edge ground with the edges thereof exposed; means for rotating said glass sheet on an axis normal to the surface thereof; and template means corresponding to the desired finished size and shape of said sheet; the improvement comprising, a carrier mounted for translation toward and away from the axis of rotation of said sheet, a rotary grinding wheel, a frame mounting said wheel for rotation, pivot means on said translatory carrier mounting said frame for oscillatory movement in said carrier on an axis parallel to the axis of rotation of said sheet; means carried by said frame and engaging said template means for controlling the translation of said carrier and thus the path of movement of the axis of rotation of said wheel relative to the axis of rotation of said sheet; an attitude control means; and means carried by said frame and cooperating with said attitude control means for compensatorily oscillating said frame in said carrier for maintaining constant the angle between (1) a line through the axis of rotation of said wheel and the line of attack of said wheel on the edge of said sheet of glass and (2) a line through the pivot means for said frame and the axis of rotation of said wheel.

2. An edge grinding machine according to claim 1 in which the carrier is mounted for pivotal movement on an axis parallel to the axis of rotation of said glass sheets.

3. In an edge grinding machine according to claim 1, pivot means mounting the grinding wheel on the frame for horizontal translation relative to said frame for disengaging said grinding wheel from the edge of a sheet of glass independently of the movement of the carrier.

4. An edge grinding machine according to claim 1 in which the template means is larger than the size and shape of the finished glass sheet by a constant dimension and is mounted parallel to said sheet for rotation coaxially therewith, and in which the means engaging said template means is a roller carried by said frame at the level of said template means, and which has means for urging said carrier toward the axis of rotation of said sheet.

5. An edge grinding machine according to claim 4 in which the attitude control means defines a path extending around and parallel to the periphery of the template means, and the means cooperating therewith consists of a pair of elements spaced on opposite sides of the template means engaging roller.

6. An edge grinding machine according to claim 1 in which the attitude control means comprises a control rail, the outer perimeter of which defines a cam and the inner perimeter of which defines a contour template, said cam having the same configuration as said contour template and being of a size larger than said template by a constant dimension in all directions relative to the axis of rotation of said rail, and larger than the finished glass sheet by a fixed dimension, and the means carried by the frame for cooperation with said cam comprises a pair of spaced rollers, a line tangent to the peripheries of both of said rollers being perpendicular to a line through the axis of rotation of the grinding wheel and the line of attack of said wheel on the edge of said sheet of glass.

7. An edge grinding machine according to claim 6 in which the rollers are mounted on spaced axes parallel to the axis of oscillation of said frame, means mounting said rollers on said frame for movement thereof along a path normal to a line tangential to the peripheries of said rollers, and means biasing said rollers away from the axis of oscillation of said frame for maintaining engagement of both of said rollers with the periphery of the attitude control cam.

8. An edge grinding machine according to claim 1 in which the grinding wheel has a circumferentially grooved periphery and is mounted for rotation by a mounting plate, and in which said mounting plate is mounted by said frame for angular adjustment of the axis of rotation of said grinding wheel relative to the axis of rotation of the glass sheet in a plane parallel to the plane of the axes of the spaced rollers.

9. In a machine for grinding around the edges of a sheet of glass having a non-circular shape, said machine having means for mounting a sheet of glases to be edge ground with the edges thereof exposed; and means for rotating said glass sheet on an axis normal to the surface thereof; the improvement comprising, a carrier mounted for translation toward and away from the axis of rotation of said sheet, a rotary grinding wheel, a frame mounting said wheel for rotation, pivot means on said translatory carrier mounting said frame for oscillatory movement in said carrier on an axis parallel to the axis of said sheet; a control rail defining by its outer perimeter an attitude control cam and by its inner perimeter a contour template, said rail corresponding to the desired finished size and shape of said sheet and being mounted co-axially with the sheet of glass and rotatable therewith; means carried by said frame and engaging said control rail for simultaneously controlling (1) the translation of said carrier and thus the path of movement of the axis of rotation of said wheel relative to the axis of rotation of said sheet and (2) for compensatorily oscillating said frame in said carrier for maintaining the line of attack of said wheel on the edge of said sheet of glass at the same position relative to said wheel mounting frame.

10. A machine according to claim 9 in which the means carried by the frame and engaging the control rail consists of a roller mounted on an axis parallel to the axis of rotation of the glass and the control rail and engaging the inner perimeter of said control rail and a pair of elements that are spaced laterally from each other and on opposite sides of a line from the axis of the grinding wheel to the line of engagement thereof with the glass sheet and that engage the outer perimeter of said control rail along a line that is parallel to a tangent to said grinding wheel at such line of engagement thereof with the glass sheet.

11. A machine according to claim 10 in which the roller and the pair of elements are resiliently urged toward each other and into embracing contact with the control rail.

References Cited
UNITED STATES PATENTS

| | | | |
|---|---|---|---|
| 2,010,922 | 8/1935 | Leonard | 51—101 |
| 2,579,337 | 12/1951 | Reaser et al. | 51—101 |
| 2,883,800 | 4/1959 | Reaser et al. | 51—101 |
| 2,906,065 | 9/1959 | Reaser | 51—101 |
| 2,995,876 | 8/1961 | Frick | 51—101 |

LESTER M. SWINGLE, *Primary Examiner*